(No Model.)

P. JACOBSON.
COUPLING FOR STEAM OR OTHER PIPES.

No. 392,032. Patented Oct. 30, 1888.

Witnesses.
Geo. W. Young.
N. E. Oliphant.

Inventor.
Peter Jacobson,
By Stout & Underwood,
Attorneys.

UNITED STATES PATENT OFFICE.

PETER JACOBSON, OF MILWAUKEE, WISCONSIN.

COUPLING FOR STEAM OR OTHER PIPES.

SPECIFICATION forming part of Letters Patent No. 392,032, dated October 30, 1888.

Application filed December 12, 1887. Serial No. 257,609. (No model.)

*To all whom it may concern:*

Be it known that I, PETER JACOBSON, of Milwaukee, in the county of Milwaukee, and in the State of Wisconsin, have invented certain new and useful Improvements in Couplings for Steam and other Pipes; and I do hereby declare that the following is a full, clear, and exact description thereof.

My invention relates to couplings for steam and other pipes, and is particularly designed for use on railway-cars, as will be fully described hereinafter.

Figure 1:
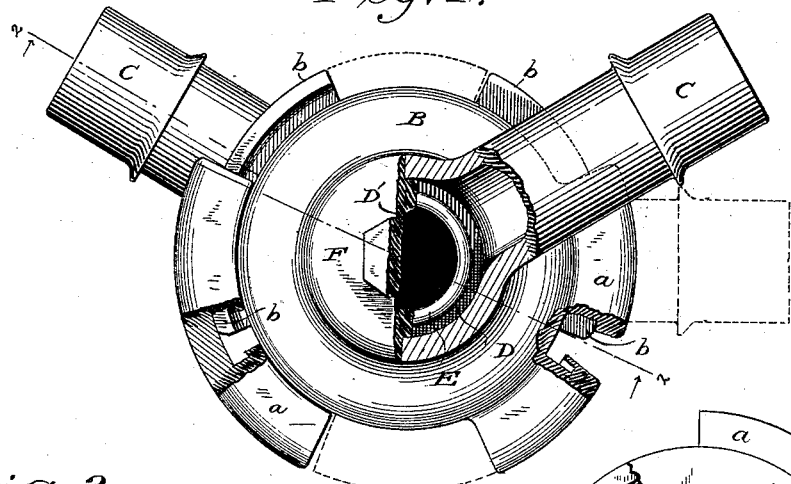
Figure 2:
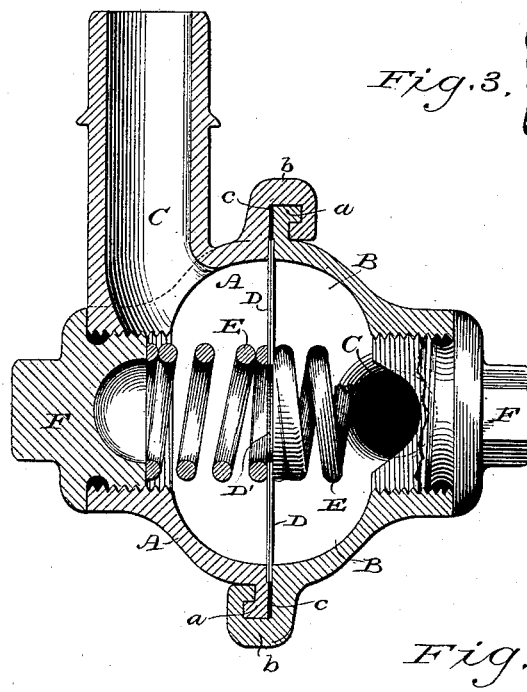
Figure 3:
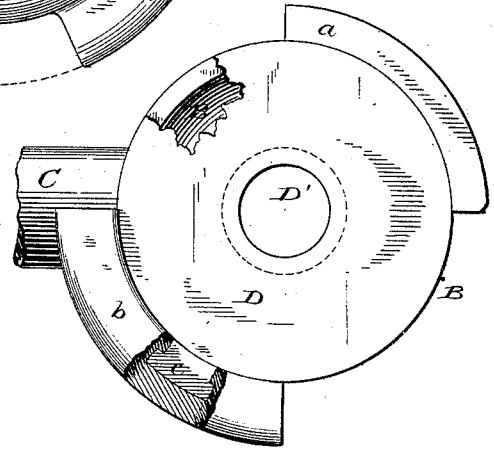
Figure 4:
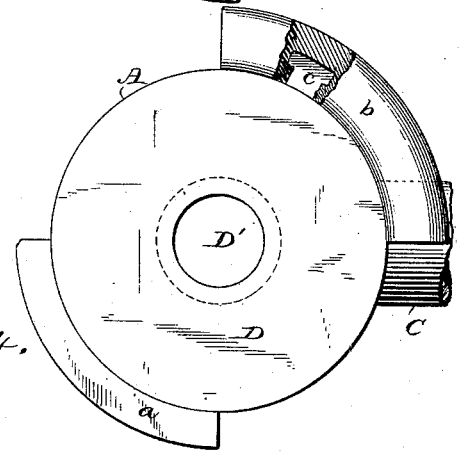

In the drawings, Figure 1 is a side elevation of my coupling with parts broken away to show the interior. Fig. 2 is a section on line 2 2, Fig. 1; and Figs. 3 and 4 are elevations of the abutting faces of the two members of the couplings.

The members A B are exactly alike, each forming a half of a hollow globe, out of which leads a tube, C, to receive a hose or other tubular connection. Each has a face seat or diaphragm, D, of elastic metal rigidly secured to it over its mouth, and each diaphragm has a central opening, D', for the passage of fluid (steam in this instance) from one to the other, and each member has an opening at right angles to its diaphragm, through which a spring, E, is introduced, said opening being screw-threaded to receive a plug, F, which closes it and at the same time holds the spring out against the inner face of the diaphragm of that member, as shown in Fig. 2.

The rim of each member A B is formed with an angle-flange, *a*, on one side and on the other side with a flange, *b*, in which is an angle-groove, *c*. The flanges *a* and *b* are directly opposite each other, and each is in length slightly less than one-quarter of the circumference of the rim of the globe.

To couple the members their faces are placed together, as shown in dotted lines, Fig. 1, and the tubes C C are turned up toward each other, causing flange *a* of member B to enter the groove in flange *b* of member A, while the flange *a* of member A enters the groove in flange *b* of member B. The coupling will now hang from the hose in about the position shown in full lines, Fig. 1, or they can hang without uncoupling in any position in which both tubes C project above a horizontal line drawn through the center of the globe; hence as they cross, approach, or recede from each other in the ordinary course of travel the members will freely oscillate upon each other and yet maintain their connection.

I do not propose to confine myself to any special form of spring for supporting the diaphragms, or to any especial form of locking mechanism for holding the members together, as these may be varied without departing from the spirit of my invention.

My device has many advantages, among which are these: As the faces of the diaphragms are held together by the springs, they will grind upon each other until they fit together perfectly; and, besides this, the greater the pressure in the globe formed by the two members the tighter will be the joint, as the pressure will compress the diaphragms together. As the members are exactly alike, they are interchangeable.

Another advantage of my invention lies in the fact that no packing is necessary.

I am aware of a pipe-coupling comprising two similar half-couplings provided with ring-seats in the bodies thereof, formed as the frustum of a cone, and each provided with two or more conical and divided metallic packing-rings loosely applied to said seats; but such I do not claim.

I am also aware of a pipe-coupling consisting of one section provided with an expansible diaphragm having a suitable opening and an annulus secured to the diaphragm in register with the opening, and another section provided with a gasket of suitable material arranged to impinge against said annulus, substantially as set forth; but such I do not claim.

Having thus fully described my invention, what I claim as new, and desire to secure by Letters Patent, is—

1. In a hose or pipe coupling, a diaphragm of elastic metal rigidly secured over the mouth of each member of the coupling and provided with a central opening, whereby when the coupling members are united the diaphragm-openings are in register and the diaphragms themselves are in frictional contact to exert a pressure one upon the other, substantially as and for the purpose set forth.

2. In a hose or pipe coupling, a diaphragm of elastic metal rigidly secured over the mouth of each member of the coupling and provided with a central opening, whereby when the coupling members are united the diaphragm-openings are in register and the diaphragms themselves are in frictional contact under pressure, and springs arranged to exert their force against said diaphragms, substantially as and for the purpose set forth.

In testimony that I claim the foregoing I have hereunto set my hand, at Milwaukee, in the county of Milwaukee and State of Wisconsin, in the presence of two witnesses.

PETER JACOBSON.

Witnesses:
N. E. OLIPHANT,
WILLIAM KLUG.